Patented Sept. 12, 1922.

1,429,188

UNITED STATES PATENT OFFICE.

STEWART J. CARROLL, OF ROCHESTER, NEW YORK, ASSIGNOR TO EASTMAN KODAK COMPANY, OF ROCHESTER, NEW YORK, A CORPORATION OF NEW YORK.

CELLULOSE ETHER SOLVENT AND COMPOSITION.

No Drawing.   Application filed April 5, 1921.   Serial No. 458,740.

*To all whom it may concern:*

Be it known that I, STEWART J. CARROLL, a citizen of the United States of America, residing at Rochester, in the county of Monroe and State of New York, have invented certain new and useful Improvements in Cellulose Ether Solvents and Compositions (Case E), of which the following is a full, clear, and exact specification.

This invention relates to solvents for making strong solutions of cellulose ether and also relates to the cellulose ether compositions produced by the aid of such solvents. One object of my invention is to provide a solvent which will dissolve such large proportions of cellulose ethers that thick or viscous flowable solutions may be obtained for use in plastic and film making arts. Another object of my invention is to provide a cellulose ether solution which may be manufactured into strong, flexible, transparent film on the machines and by the methods now in use.

In U. S. Patent No. 1,188,376, Lilienfeld, June 20, 1916, there are disclosed a series of alkyl ethers of cellulose. Certain of these are practically insoluble in water, and my invention relates but is not limited to the ethers having that property. While such ethers form thin solutions in the lower monohydroxy aliphatic alcohols or in ethylene chloride, it has been found that the single solvents by themselves will not dissolve a sufficient proportion of the ethers to make a desirably thick flowable composition or dope, such as may be used in the manufacture of photographic film base by the customary methods, and in the other plastic arts.

I have discovered that an adequately strong and useful solvent may be prepared by mixing ethylene chloride with one or more of the lower monohydroxy aliphatic alcohols. While the proportions in which the ingredients may be mixed can be varied considerably, the following examples illustrate useful ranges. I may, for example, mix 90 to 40 parts by weight of ethylene chloride with 10 to 60 parts of methyl alcohol, or I may use 10 to 60 parts of ethyl alcohol in place of the methyl alcohol. While the amounts of ethers which may be dissolved in my compound solvents can vary widely, it is noted, by way of illustration, that a useful viscous flowable solution can be obtained by dissolving one part of water-insoluble ethyl cellulose in 5 parts of one of the above mentioned compound solvents. Other substances which impart additional suppleness, or incombustibility or other qualities to the film may then be added to the dope, such, for instance, as triphenyl or tricresyl phosphate, camphor, etc.

The ingredients are of the ordinary commercial type and sufficiently purified for the process of film manufacture, so as to give a dope yielding films having the proper relative freedom from color. The viscous-flowable dope above described can be used in connection with the usual film-forming apparatus without the necessity of expensive alterations in the latter. By the term lower monohydroxy aliphatic alcohols I wish to indicate in the present case those having up to and including 5 carbon atoms.

Having thus described my invention, what I claim as new and desire to secure by Letters Patent is:

1. A compound solvent for ethers of cellulose, comprising a mixture of ethylene chloride and a lower monohydroxy aliphatic alcohol.

2. A compound solvent for alkyl ethers of cellulose, comprising from 90 to 40 parts by weight of ethylene chloride and 10 to 60 parts of a lower monohydroxy aliphatic alcohol.

3. A compound solvent for alkyl ethers of cellulose, comprising a mixture of ethylene chloride and methyl alcohol.

4. A viscous flowable film-forming composition, comprising an ether of cellulose dissolved in a mixture of ethylene chloride and a lower monohydroxy aliphatic alcohol.

5. A viscous flowable film-forming composition, comprising an alkyl ether of cellulose dissolved in a compound solvent containing from 90 to 40 parts by weight of ethylene chloride and 10 to 60 parts by weight of a lower monohydroxy aliphatic alcohol.

6. A composition of matter, comprising 1 part of water-insoluble ethyl cellulose dissolved in approximately 5 parts by weight of a compound solvent containing ethylene chloride and methyl alcohol.

Signed at Rochester, New York, this 26th day of March, 1921.

STEWART J. CARROLL.